US008947048B2

(12) United States Patent
Roessler

(10) Patent No.: US 8,947,048 B2
(45) Date of Patent: Feb. 3, 2015

(54) POWER SUPPLY SYSTEM WITH CHARGE BALANCING

(75) Inventor: Werner Roessler, Neufahrn (DE)

(73) Assignee: Infineon Technologies AG, Neubiberg (DE)

( * ) Notice: Subject to any disclaimer, the term of this patent is extended or adjusted under 35 U.S.C. 154(b) by 489 days.

(21) Appl. No.: 13/194,413

(22) Filed: Jul. 29, 2011

(65) Prior Publication Data
US 2013/0026991 A1 Jan. 31, 2013

(51) Int. Cl.
*H02J 7/00* (2006.01)

(52) U.S. Cl.
CPC .......... *H02J 7/0016* (2013.01); *Y02T 10/7055* (2013.01)
USPC ............................ 320/116; 320/103; 320/118

(58) Field of Classification Search
CPC ................. Y02E 60/12; H02J 7/1423
USPC .......................................... 320/116, 126, 103
See application file for complete search history.

(56) References Cited

U.S. PATENT DOCUMENTS

| 5,869,950 A | 2/1999 | Hoffman, Jr. et al. | |
|---|---|---|---|
| 7,573,154 B2 * | 8/2009 | Tsui et al. | 307/42 |
| 7,804,276 B2 | 9/2010 | Roessler | |
| 2001/0038275 A1 | 11/2001 | Hanada | |
| 2002/0017895 A1 * | 2/2002 | Kawashima | 320/118 |
| 2006/0038532 A1 * | 2/2006 | Taniguchi | 320/103 |
| 2008/0179957 A1 | 7/2008 | Tsui et al. | |
| 2011/0115436 A1 | 5/2011 | Zhang et al. | |
| 2012/0074895 A1 * | 3/2012 | Roeper | 320/103 |
| 2012/0194133 A1 * | 8/2012 | Posamentier et al. | 320/116 |

FOREIGN PATENT DOCUMENTS

| JP | 2001177914 A | 6/2001 |
|---|---|---|
| JP | 2009055687 A | 3/2009 |
| JP | 2009055690 A | 3/2009 |
| JP | 2010004679 A | 1/2010 |
| JP | 2011061920 A | 3/2011 |

* cited by examiner

*Primary Examiner* — Edward Tso
*Assistant Examiner* — Ahmed Omar
(74) *Attorney, Agent, or Firm* — Slater & Matsil, L.L.P.

(57) ABSTRACT

A power supply system includes a first charge storage. A series circuit with a plurality of n charge storage modules is connected between load terminals. A second charge storage includes load terminals. A charge transfer arrangement includes at least one charge transfer unit coupled between one of the charge storage modules and the load terminals of the second charge storage. The charge transfer arrangement is configured to transfer upon request electrical charge from the one charge storage module to the second charge storage.

32 Claims, 6 Drawing Sheets

POWER SUPPLY SYSTEM WITH CHARGE BALANCING

TECHNICAL FIELD

Embodiments of the present invention relate to a power supply system, in particular, an automotive power supply system in an electric car or a hybrid car.

BACKGROUND

Electric cars or hybrid cars include at least one electric motor for driving the car and a rechargeable battery (accumulator), such as a lithium-ion battery, or a double layer capacitor arrangement, for supplying the at least one motor with electric power. The battery usually includes a plurality of battery modules that are connected in series, where the individual modules may be arranged distributed throughout the car and connected with each other by power lines.

The individual battery modules each provide a module supply voltage, where the supply voltage of the battery equals the sum of the module supply voltages. Due to variations in the manufacturing process of the individual modules the capacitances of the individual battery modules may be slightly different. Thus, some battery modules may be charged faster than others during a charging process in which the battery is charged, and some battery modules may be discharged faster than others during a discharging process, which is when the battery supplies power to the load. The individual battery modules should not be charged above an upper charging limit and should not be discharged below a lower charging limit. Thus, unless there is a charge balancing, the charging process would have to be stopped when one module reaches the upper limit, although other modules may not have been completely charged yet, and the discharging process would have to be stopped when one module reaches the lower limit, although other modules may not have been completely discharged yet. Different charging states of the individual modules could also result from a self-discharging of the modules.

"Charge balancing" means that electrical charge is selectively taken from individual modules or is selectively provided to individual modules in order to compensate for charge imbalances of the individual modules.

A known charge balancing circuit includes a transformer with a plurality of first windings each connected to one of the modules and a second winding connected between the load terminals of the battery. In this circuit, electrical charge can be taken from one of the modules and can be fed back into the battery, or charge can be taken from the battery and can be fed back into one of the battery modules. In this circuit, however, the battery voltage, which can be several 100V, such as 400V, is present across the second winding. This requires high voltage insulation means which can be difficult to implement and costly when the modules are distributed in the car.

There is a need for a power supply system with an efficient, flexible and easy to implement charge balancing.

SUMMARY OF THE INVENTION

A first aspect relates to a power supply system. The power supply system includes a first charge storage having load terminals and a series circuit with a plurality of n charge storage modules, wherein n>1, connected between the load terminals, and a second charge storage having load terminals. The power supply system further includes a charge transfer arrangement including at least one charge transfer unit coupled between one of the charge storage modules and the load terminals of the second charge storage. The charge transfer unit is configured to transfer upon request electrical charge from the one charge storage module to the second charge storage.

A second aspect relates to an automotive electric system including a power supply system. The power supply system includes a first charge storage having load terminals and a series circuit with a plurality of n charge storage modules, wherein n>1, connected between the load terminals, and a second charge storage having load terminals. The power supply system further includes a charge transfer arrangement including at least one charge transfer unit coupled between one of the charge storage modules and the load terminals of the second charge storage. The charge transfer unit is configured to transfer upon request electrical charge from the one charge storage module to the second charge storage. The automotive electric system further includes at least one first load connected to the load terminals of the first charge storage, at least one second load connected to the load terminals of the second charge storage.

BRIEF DESCRIPTION OF THE DRAWINGS

Examples are explained with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION OF ILLUSTRATIVE EMBODIMENTS

Embodiments of the present invention will now be explained in a specific context, namely in context with an automotive power supply system. However, embodiments of the invention are not restricted to be used in connection with an automotive power supply system, but embodiments of the invention may be applied to each application that includes a rechargeable charge storage with a plurality of charge storage modules.

Figure 1:
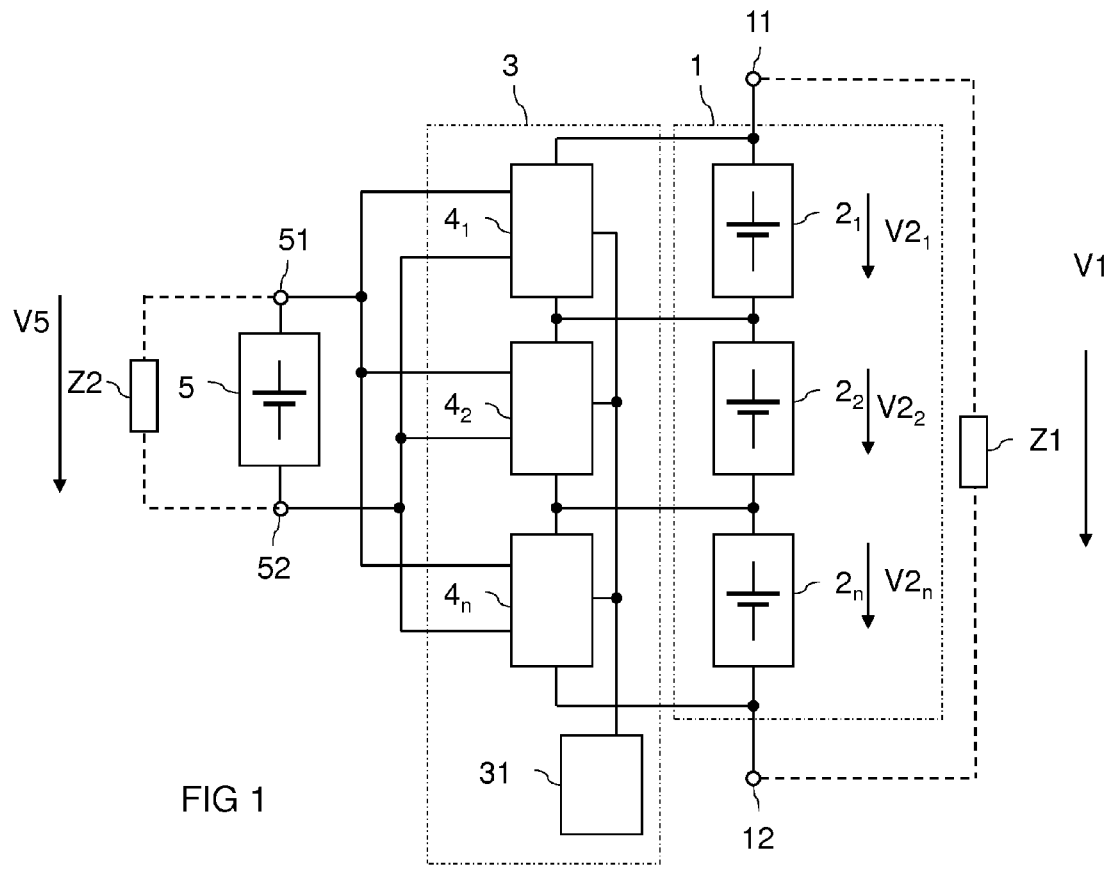
FIG. 1 schematically illustrates a first embodiment of a power supply system including a first charge storage with a plurality of charge storage modules, a second charge storage, and a charge transfer arrangement.

FIG. 1 schematically illustrates a first embodiment of a power supply system. The power supply system includes a first charge storage 1 including a plurality of n charge storage modules $2_1$, $2_2$, $2_n$ that are connected in series between load terminals 11, 12 of the first charge storage 1, where n>1. The first charge storage 1 provides a first supply voltage V1 between the load terminals 11, 12, where the first supply voltage V1 is the sum of individual module supply voltages $V2_1$, $V2_2$, $V2_n$, provided between output terminals of the individual charge storage modules $2_1$, $2_2$, $2_n$. According to one embodiment, the output voltage provided by each of the charge storage modules $2_1$, $2_2$, $2_n$ is between 40V and 60V when the individual module is completely charged. The number n of charge storage modules connected in series is dependent on the desired charge storage output voltage V1. According to one embodiment, this output voltage V1 is between 350V and 450V, so that between 8 and 12 charge storage modules $2_1$, $2_2$, $2_n$ are connected in series. For illustration purposes, only three charge storage modules are illustrated in FIG. 1.

The first charge storage 1 is, for example, a lithium-ion battery having a plurality of battery modules forming the charge storage modules $2_1$, $2_2$, $2_n$, where each battery module may include a plurality of battery cells connected in series. According to a further embodiment, the first charge storage 1 is an arrangement with a plurality of capacitors, such as double layer capacitors, where each module $2_1$, $2_2$, $2_n$ may includes a plurality of capacitors connected in series. Double layer capacitors (supercapacitors, ultracapacitors) have a huge capacitance at a given device volume.

The power supply system is, in particular, an automotive power supply system that can be used in an electric car or in a hybrid car. A load Z1 supplied by the charge storage output voltage V1 is, for example, a motor unit including an electrical motor and an inverter. The individual charge storage modules $2_1$, $2_2$, $2_n$ can be arranged at different positions within the car, where the individual modules are electrically connected with each other by power lines.

The first charge storage 1 can be charged by connecting a charge storage charger (not shown) to the load terminal 11, 12. Charging a charge storage, such as the first charge storage 1 illustrated in FIG. 1, is commonly known, so that no further explanations are required in this regard.

Referring to FIG. 1, the power supply system further includes a second charge storage 5 having load terminals 51, 52. The second charge storage 5 provides a second charge storage supply voltage V5 between its load terminals 51, 52. According to one embodiment, the second charge storage supply voltage V5 is lower than the first charge storage supply voltage V1. The second charge storage supply voltage V5 is, for example, between 10V and 15V. According to one embodiment, the second charge storage 5 is a conventional car battery providing a supply voltage of about 12V when completely charged.

Each charge storage module $2_1$, $2_2$, $2_n$ has a capacitance. The capacitance of one charge storage module is its capability to store electrical charge. Due to variations in the manufacturing process of the charge storage module $2_1$, $2_2$, $2_n$ the capacitances of the individual modules can be (slightly) different. Thus, some charge storage modules may be charged faster than others during a charging process, and some charge storage modules may be discharged faster than others during a discharging process. In a charging process a charge storage charger (not shown) charges the first charge storage 1 via the load terminals 11, 12. In a discharging process the first charge storage 1 provides electrical power to the load or load arrangement Z1 connected to the load terminals 11, 12. In this connection it should be noted that load Z1 illustrated in FIG. 1 may represent a plurality of loads connected in parallel and each connected to the load terminals 11, 12 of the first charge storage 1.

The individual charge storage modules $2_1$, $2_2$, $2_n$ should not be discharged to below a lower charging state limit and should not be charged to above a higher charging state limit. The lower limit is, for example, defined by a minimum supply voltage that can be supplied by one charge storage module $2_1$, $2_2$, $2_n$, and the upper limit is, for example, defined by a maximum supply voltage that can be provided by the individual charge storage modules $2_1$, $2_2$, $2_n$. Due to the mentioned differences in the individual capacitances of the charge storage modules $2_1$, $2_2$, $2_n$ situations may occur in which one charge storage module has already reached its lower limit, while other modules are still far above the lower limit, and situations may occur in which one module has reached the upper limit, while others are still far below the upper limit. Different charging states of the individual charge storage modules $2_1$, $2_2$, $2_n$ may also result from a self-discharging of the charge storage modules.

In order to be able to efficiently use the overall capacitance of the first charge storage 1 it is desired to balance the charging states of the individual charge storage modules $2_1$, $2_2$, $2_n$. A charging state of one charge storage module is, for example, defined by the module supply voltage $V2_1$, $V2_2$, $V2_n$ provided by one module, wherein the charging state of one module decreases when the supply voltage provided by this module decreases. When the charging states of the individual charge storage modules $2_1$, $2_2$, $2_n$ are balanced, the modules $2_1$, $2_2$, $2_n$ jointly approach their individual lower limits in a discharging process and jointly approach their individual upper limits in a charging process.

In order to balance the charging states of the individual charge storage modules $2_1$, $2_2$, $2_n$ the power supply system includes a charge transfer arrangement 3 connected between the first charge storage 1 and the second charge storage 5. The charge transfer arrangement 3 includes at least one charge transfer module $4_1$, $4_2$, $4_n$. In the embodiment illustrated in FIG. 1, the charge transfer arrangement 3 includes n charge transfer modules, so that each charge storage module $2_1$, $2_2$, $2_n$ has one charge transfer module $4_1$, $4_2$, $4_n$ assigned thereto. The charge transfer arrangement 3 is configured to selectively transfer electrical charge from one charge storage module to the second charge storage 5, so that the charge storage module from which electrical charge (electrical energy) is taken is discharged to a certain extent. The charge transfer arrangement 3 is, for example, configured to monitor the supply voltages $V2_1$, $V2_2$, $V2_n$ of the individual charge storage modules $2_1$, $2_2$, $2_n$ and to transfer charge from the charge storage module currently having the highest supply voltage to the second charge storage 5. Through this, the charging states of the individual charge storage modules can be balanced.

Although, the charge transfer circuit 3 is only capable of taking energy (discharging) the charge storage modules $2_1$, $2_2$, $2_n$ in order to balance the charging states, and although the energy taken from one charge storage module is neither fed back into another charge storage module of the first charge storage 1 nor into the first charge storage 1 via the load terminals 11, 12, no energy is wasted. The energy taken from one of the charge storage modules $2_1$, $2_2$, $2_n$ is stored in the second charge storage 5 and is, therefore, used to supply the load or load arrangement Z2 connected to the second charge storage 5. It should be noted in this connection that the load Z2 illustrated in FIG. 1 may represent a plurality of loads connected to the second charge storage 5. In an automotive power supply system loads Z2 connected to the second charge storage 5 may, for example, include: motors for electric window lifters, electric seat adjustments, or fans; heating or cooling elements of an air-conditioning system; sensors; lighting; and the like. Additionally, a generator (not shown) may be connected to the load terminals 51, 52 of the second charge storage 5. This generator may serve to recharge the charge storage 5.

Referring to FIG. 1, the charge transfer arrangement 3 may include a control circuit 31 that is in signal communication with the individual charge transfer modules $4_1$, $4_2$, $4_n$ via a signal communication path. The signal communication path between the control circuit 31 and the individual charge transfer modules $4_1$, $4_2$, $4_n$ may be a conventional signal communication path that is configured to provide for a signal communication between the control circuit 31 and each of the charge transfer modules $4_1$, $4_2$, $4_n$ and to provide for a signal communication between each of the charge transfer modules $4_1$, $4_2$, $4_n$ and the control circuit. This signal communication path is only schematically illustrated in FIG. 1. Each of the charge transfer modules $4_1$, $4_2$, $4_n$ is, for example, configured to measure the supply voltage $V2_1$, $V2_2$, $V2_n$ of the corresponding charge storage modules $2_1$, $2_2$, $2_n$ and is configured to provide an information on this supply voltage to the control circuit 31 via the signal communication path. The control circuit 31 is, for example, configured to monitor the power supply voltages based on the information received from the charge transfer modules $4_1$, $4_2$, $4_n$ and is configured to request one of the charge transfer modules $4_1$, $4_2$, $4_n$, such as the charge transfer modules $4_1$, $4_2$, $4_n$ connected to the charge storage module $2_1$, $2_2$, $2_n$ having the highest charging state, to transfer energy from the associated charge storage module to the second charge storage 5.

Figure 2:
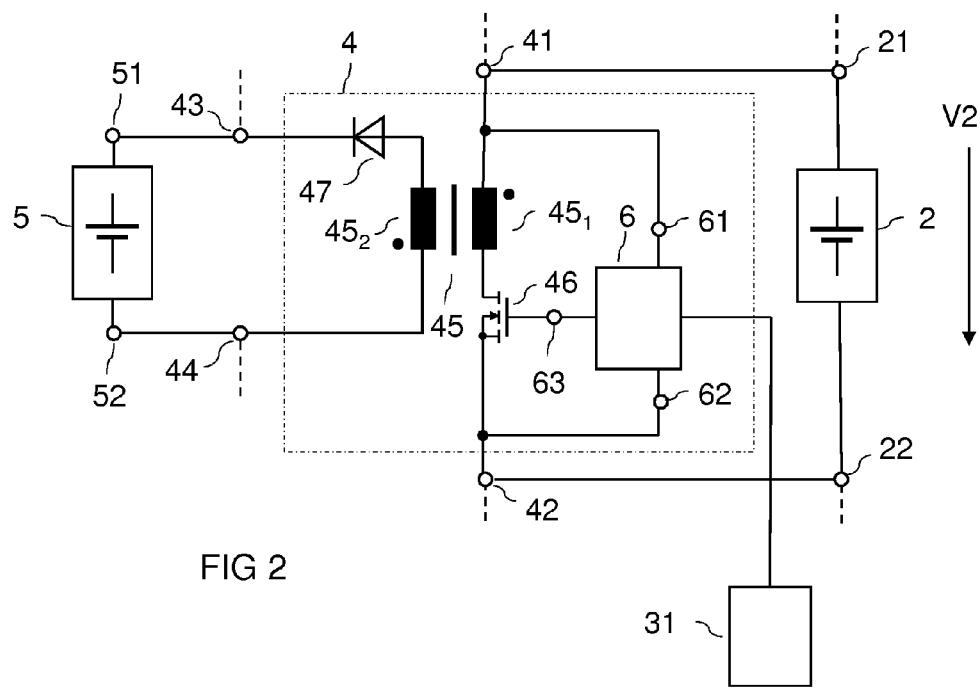
FIG. 2 schematically illustrates an embodiment of one charge transfer module of the charge transfer arrangement.

FIG. 2 illustrates one embodiment of one charge transfer module. Reference character 4 in FIG. 2 represents one of the charge transfer modules $4_1$, $4_2$, $4_n$ illustrated in FIG. 1. Reference character 2 in FIG. 2 represents the charge storage module connected to this charge transfer module 4. It should be noted that the individual charge transfer modules may have an identical topology, such as the topology illustrated in FIG. 2.

Referring to FIG. 2, the charge transfer module 4 is implemented as a flyback-converter and includes a transformer 45 with a first winding (primary winding) $45_1$ and a second winding (secondary winding) $45_2$. The first winding $45_1$ is connected in series with the electronic switch 46, where the series circuit with the electronic switch 46 and the first winding $45_1$ is connected between input terminals 41, 42 of the charge transfer module 4. The input terminals $41_1$, 42 of the charge transfer module 4 are connected to load terminals 21, 22 of the associated charge storage module, where a first input terminal 41 is connected to a first load terminal 21 and a second input terminal 42 is connected to a second load terminal 22. The load terminals of the charge storage modules $2_1$, $2_2$, $2_n$ are the terminals that are used to connect the individual charge storage modules $2_1$, $2_2$, $2_n$ in series, wherein the first terminal of each module is connected to the second terminal of another module. The first terminal of one of the modules, such as a first module $2_1$ in FIG. 1, forms the first load terminal 11 of the first charge storage 1, and a second terminal of another module, such as the n-th module $2_n$ in FIG. 1, forms the second load terminal 12 of the first charge storage.

Referring to FIG. 2, the second winding $45_2$ is coupled to the load terminals 51, 52 of the second charge storage 5 via a rectifier element 47, such as a diode. Specifically, a series circuit with the second winding $45_2$ and the diode 47 is connected in parallel with the second charge storage 5 via the load terminals 51, 52 of the second charge storage. Input terminals 43 and 44 are shown connected to load terminals 51, 52 between charge storage 5 and the series circuit with second winding $45_2$ and the diode 47.

The electronic switch 46 connected in series with the first winding $45_1$ can be implemented as a MOSFET, in particular, as an enhancement MOSFET. However, this is only an example. The electronic switch 46 could also be implemented as any other type of conventional electronic switch, such as a depletion MOSFET, an IGBT (Insulate Gate Bipolar Transistor) or a BJT (Bipolar Junction Transistor). The electronic switch 46 includes a load path connected in series with the first winding $45_1$ and a control terminal. When the electronic switch 46 is implemented as a MOSFET, a load path is an internal path of the MOSFET between the drain terminal and the source terminal, and the control terminal is the gate terminal.

The charge transfer module 4 further includes a control and drive unit 6. The control and drive unit 6 is configured to drive the electronic switch 46, which means to switch the electronic switch 46 on and off. Further, the control and drive unit 6 is in signal communication with the control circuit 31, which is also illustrated in FIG. 2, via the signal communication path. This signal communication path is only schematically illustrated in FIG. 2. Further, the control and drive unit 6 is configured to measure the supply voltage V2 provided by the charge storage module 2. For this, input terminals 61, 62 of the control and drive unit 6 are connected to the input terminals 41, 42 of the charge transfer module 4. For driving the electronic switch 46 the control and drive unit 6 includes a drive terminal 63 that is coupled to the control terminal of the electronic switch 46.

The charge transfer module 4 can be activated and deactivated by the control circuit 31 via the signal communication path. In the activated state the charge transfer module 4 transfers electrical charge (energy) from the charge storage module 2 to the second charge storage 5. The operating principle of the charge transfer module 4 in the activated state is now explained.

In the activated state of the charge transfer module 4, the electronic switch 46 is cyclically switched on and off. When the electronic switch 46 is switched on, a current flows through the first winding $45_k$, so that energy is magnetically stored in the first winding $45_1$ of the transformer 45. When the electronic switch 46 is subsequently switched off, the energy stored in the primary winding $45_1$ is transferred to the second winding $45_2$, where this energy transferred to the second winding $45_2$ causes a current from the second winding $45_2$ via the rectifying element 47 into the second charge storage 5. The rectifying element 47 is connected such that the second charge storage 5 cannot be discharged via the second winding $45_2$. The first winding $45_1$ and the second winding $45_2$ have opposite winding senses.

In every drive cycle electrical energy is transferred from the charge storage module 2 to the second charge storage 5, where a drive cycle includes a switched-on period (on-period) of the electronic switch 46 and a switched-off period (off-period) of the electronic switch 46. The duration of the on-periods and the off-periods can be controlled in many different ways. According to one embodiment, the duration of the on-periods and the subsequent off-periods is fixed. According to a further embodiment, the duration of the on-periods is fixed and the duration of the off-periods is dependent on a magnetization state of the transformer 45, where, e.g., the off-periods end (and a new on-period starts) each time the transformer has been demagnetized.

A duration, for which one charge transfer module 4 is activated can be controlled in many different ways. According to one embodiment, the duration for which one charge transfer module 4 is activated is fixed. According to a further embodiment, this duration is, for example, dependent on a rate of change of the supply voltage V2. According to one embodiment, the control circuit 31 is configured to activate the charge transfer module 4 as long as required for the supply voltage V2 to decrease for a given voltage value. According to a further embodiment one module is activated as long as required for transferring a given energy from one module $2_1$, $2_2$, $2_n$ to the second charge storage 5. According to one embodiment, the control circuit 31 determines the charging states of the individual modules $2_1$, $2_2$, $2_n$ only based on the module supply voltages $V2_1$, $V2_2$, $V2_n$. According to a further embodiment, other parameters, such as the capacitances of the individual modules $2_1$, $2_2$, $2_n$ are also taken into account.

Figure 3:
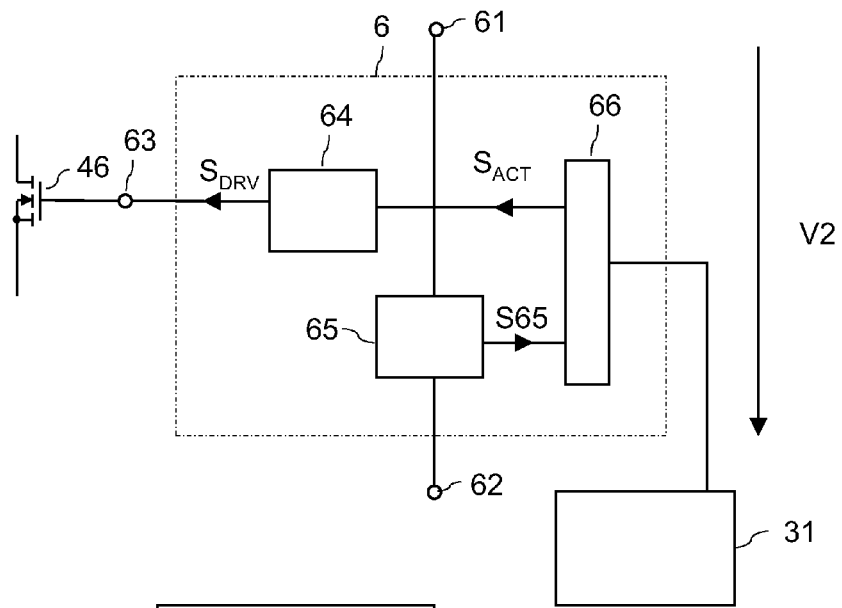
FIG. 3 schematically illustrates an embodiment of a control circuit of the charge transfer module of FIG. 2.

FIG. 3 schematically illustrates an embodiment of a control and drive unit 6 of one charge transfer module 4. It should be noted that the block diagram illustrated in FIG. 3 serves to illustrate the operating principle of the control and drive unit 6 rather than its implementation. The individual function blocks illustrated in FIG. 3 can be implemented in many different ways, such as using dedicated integrated circuits, a microcontroller on which software is running, and the like.

Referring to FIG. 3 the control and drive unit 6 includes an interface unit 66 that is coupled to the signal path that connects the control circuit 31 (which is also schematically illustrated in FIG. 3) with the individual charge transfer modules 4. The specific implementation of the interface unit 66 is dependent on the specific type of signal path between the control circuit 31 and the individual charge transfer modules 4. Specific embodiments of the signal path are explained with reference to FIGS. 4 and 5 below.

The control and drive unit 6 further includes a drive unit 64 coupled to the interface unit 66 to receive an activation signal $S_{ACT}$ and coupled to the drive terminal 63 to provide a drive signal $S_{DRV}$ to the electronic switch 46 (which is also illustrated in FIG. 3). Further, the control and drive unit 6 includes a voltage measurement unit 65 coupled between the input terminals 61, 62 and configured to provide a voltage measurement signal S65 that is representative of the measured charge storage module voltage to the interface unit 66.

The activation signal $S_{ACT}$ may assume one of two different signal levels, namely, an activation signal level that activates the drive unit 64, and a deactivation signal level, that deactivates the drive unit 64. When the drive unit 64 is activated, it cyclically switches the electronic switch 46 on and off, in order to transfer electrical charge from the associated charge storage module to the second charge storage 5. The interface unit 66 generates the activation signal and the deactivation signal level of the activation signal $S_{ACT}$ dependent on signal information the interface unit 66 receives from the control circuit 31. The supply voltage information included in the measurement signal S65 is forwarded to the control circuit 31 through the interface unit 66.

The signal path for the signal communication between the control circuit 31 and the individual charge transfer modules can be a conventional signal path or signal communication that is suitable to transmit information between individual modules in an electronic system.

Figure 4:
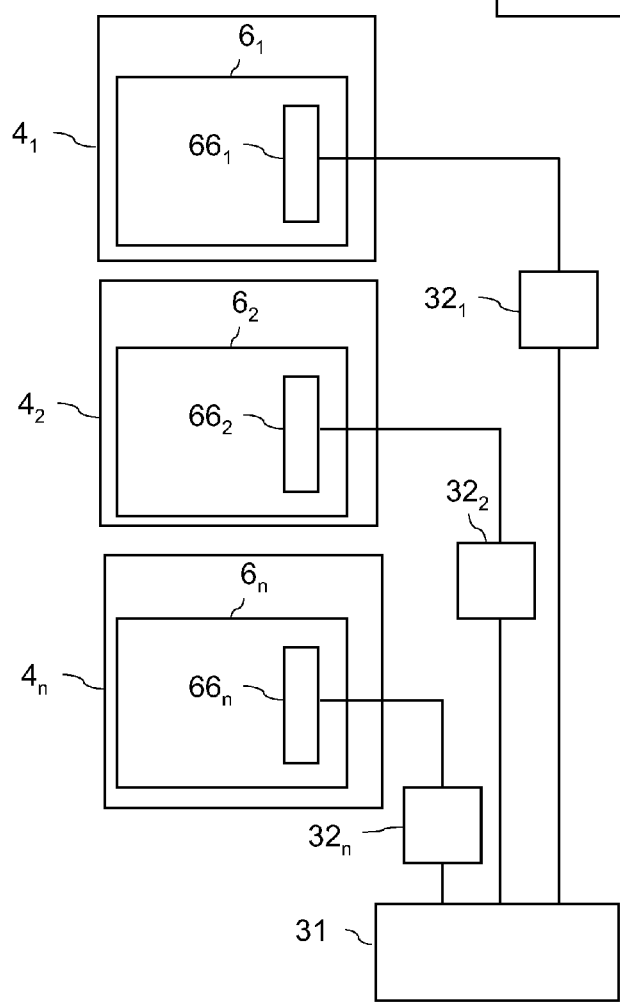
FIG. 4 illustrates a first embodiment of a signal communication between the control circuit and charge transfer modules.

A first embodiment for implementing a signal communication between the control circuit 31 and the charge transfer modules $4_1$, $4_2$, $4_n$ is schematically illustrated in FIG. 4. FIG. 4 schematically illustrates the charge transfer modules $4_1$, $4_2$, $4_n$ of the power supply system and the control and drive units $6_1$, $6_2$, $6_n$ with the interface units $66_1$, $66_2$, $66_n$ of the power supply system. In the embodiment illustrated in FIG. 4, there are signal lines or signal paths connected between the control circuit 31 and the interface units $66_1$, $66_2$, $66_n$ of each of the charge transfer modules $4_1$, $4_2$, $4_n$. These signal lines may be bidirectional signal lines that allow signal communication from the control circuit 31 to the charge transfer modules $4_1$, $4_2$, $4_n$ in order to activate one of the charge transfer modules $4_1$, $4_2$, $4_n$, and that allow a signal communication from the individual charge transfer module $4_1$, $4_2$, $4_n$ to the control circuit 31, in order to forward information on the respective charge storage module voltage to the control circuit.

According to a further embodiment, at least two unidirectional signal paths are connected between the control circuit 31 and each of the charge transfer modules $4_1$, $4_2$, $4_n$. One these signal paths between the control circuit 31 and each of the charge transfer modules $4_1$, $4_2$, $4_n$ provides for the signal communication from the control circuit 31 to the charge transfer module, while the other signal path provides for the signal communication from the charge transfer module to the control circuit 31. Further, level shifters $32_1$, $32_2$, $32_n$ are connected between the control circuit 31 and the individual charge transfer modules $4_1$, $4_2$, $4_n$. Any suitable transfer protocol can be implemented for the signal communication between the control circuit 31 and the individual charge transfer modules $4_1$, $4_2$, $4_n$.

Figure 5:
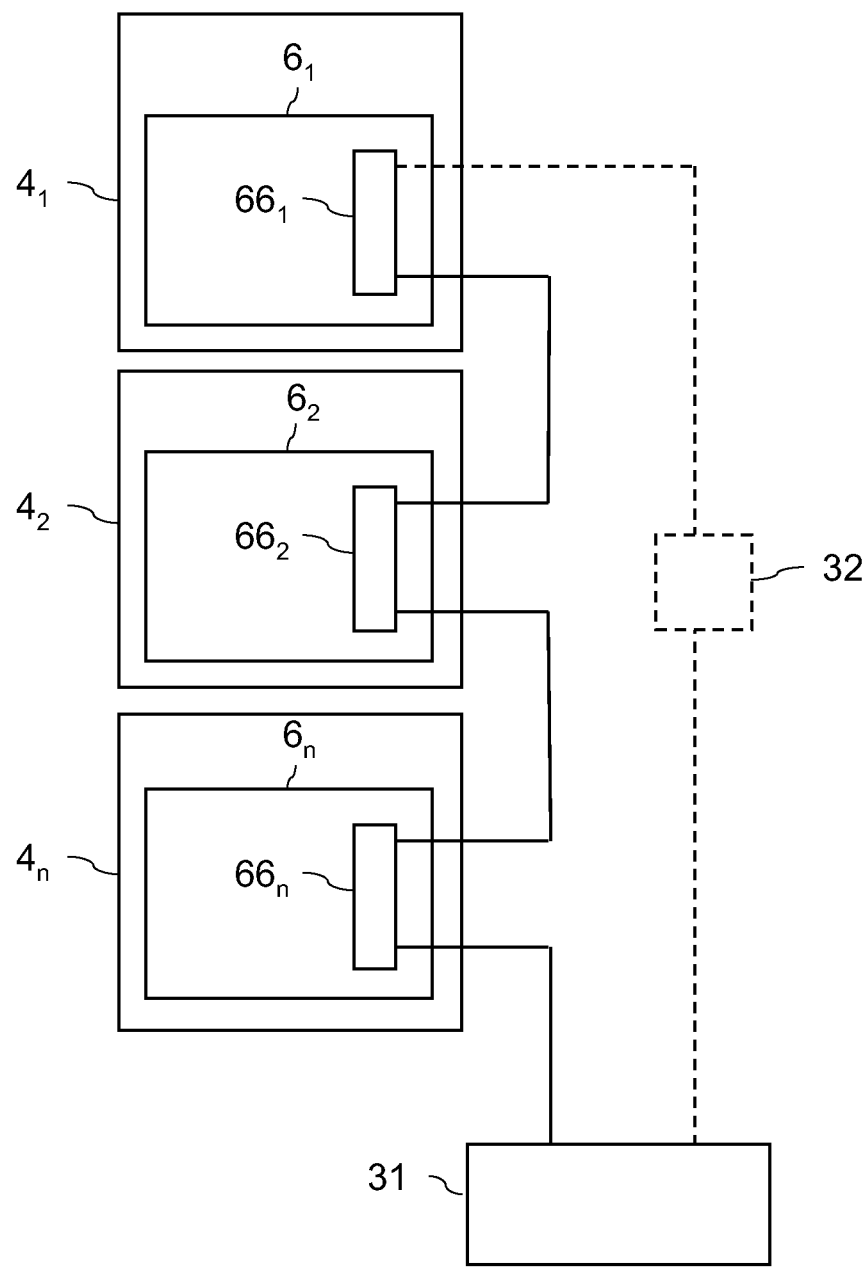
FIG. 5 illustrates a second embodiment of a signal communication between the control circuit and charge transfer modules.

FIG. 5 illustrates a further embodiment of implementing a signal communication between the control circuit 31 and the individual charge transfer module $4_1$, $4_2$, $4_n$. In this embodiment, the power supply system includes a communications bus that is connected to the control circuit 31 and to each of the charge transfer modules $4_1$, $4_2$, $4_n$. In this specific embodiment illustrated in FIG. 5 this bus connects the control circuit 31 to a first one $4_1$ of the charge transfer module, and that connects the first module $4_1$ with the second module $4_2$ and so on. The control circuit 31 is connected to a first end of the bus, and a last module $4_n$ of the module chain is connected to the second end of the bus. This bus can be implemented as a daisy-chain bus. Optionally, the communication bus is implemented as a ring-bus so that the last module $4_n$ in the series circuit is connected to the control circuit 31 via a level shifter 32. Any conventional bus protocol that is suitable to transmit information via a bus between electronic modules in an electronic system is suitable to be implemented in the system as illustrated in FIG. 5.

Figure 6:
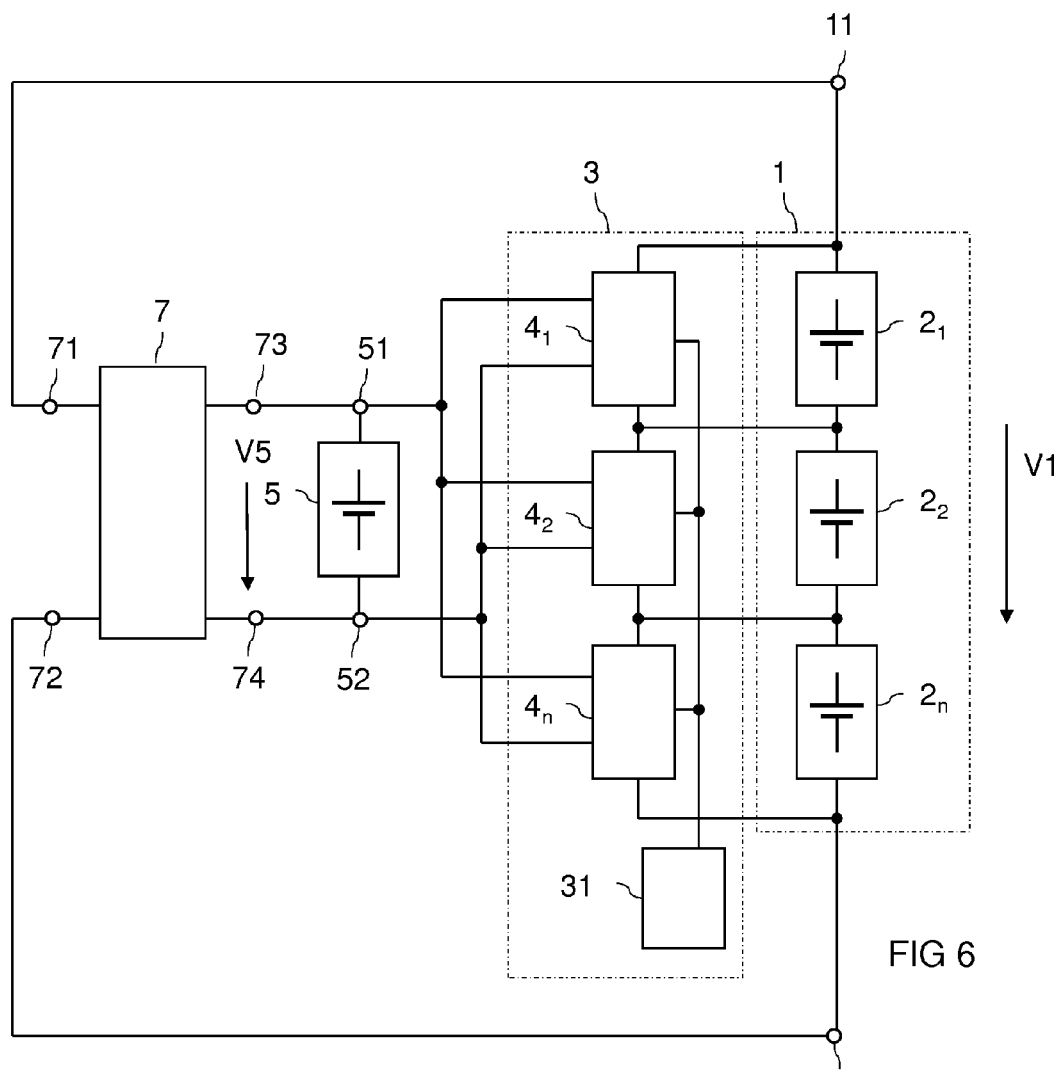
FIG. 6 illustrates an embodiment of a power supply system which has a DC/DC converter arranged between the first charge storage and the second charge storage.

FIG. 6 illustrates a further embodiment of a power supply system. In this power supply system a DC/DC converter 7 is connected between the load terminals 11, 12 of the first charge storage 1 and the load terminals 51, 52 of the second charge storage 5. The DC/DC converter 7 is configured to charge the second charge storage 5 by taking energy from the first charge storage 1. The DC/DC converter 7 has input terminals 71, 72 that are coupled to the load terminals 11, 12 of the first charge storage 1 and output terminals 73, 74 that are coupled to the load terminals 51, 52 of the second charge storage 5.

The DC/DC converter 7 can be implemented as a conventional DC/DC converter, in particular a DC/DC converter with a potential barrier between the first charge storage 1 and the second charge storage 5. The potential barrier is required when the first and second charge storages 1, 5 do not have the same reference potential. According to one embodiment, the reference potential of the first charge storage 5, which is the electrical potential at the second terminal 52, is ground of the vehicle, while the electrical potential at the second terminal 12 of the first charge storage 1 is 0.5·V1 below ground.

Figure 7:
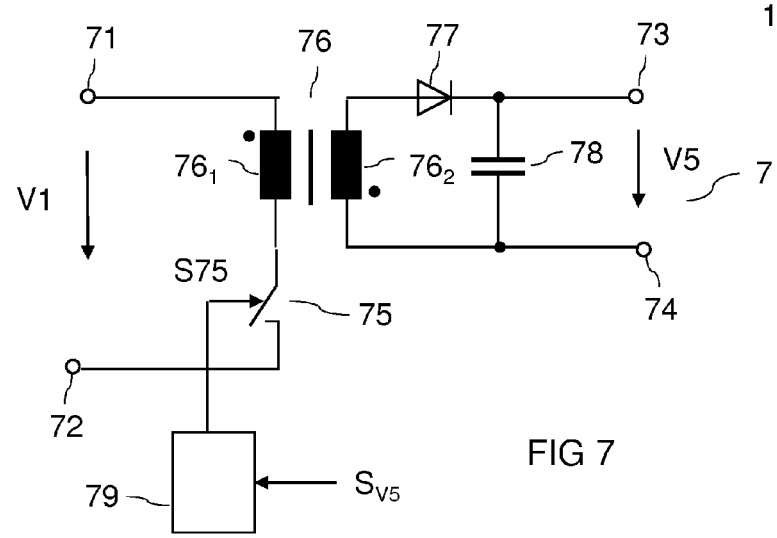
FIG. 7 illustrates an embodiment of the DC/DC converter.

Just for illustration purposes one embodiment of a DC/DC converter with potential barrier is illustrated in FIG. 7. The DC/DC converter illustrated in FIG. 7 is implemented as a flyback converter and includes a first electronic switch 75 and a transformer 76 with a primary winding $76_1$ and a secondary winding $76_2$. The primary winding $76_1$ and the secondary winding $76_2$ have opposite winding senses. The first electronic switch 75 is connected in series with the primary winding $76_1$ and the series circuit with the first electronic switch 75 and the primary winding $76_1$ is connected between the input terminals 71, 72. The electronic switch 75 can be implemented as conventional electronic switch, such as a MOSFET, an IGBT, or BJT.

The secondary winding $76_2$ is coupled to output terminals 73, 74 of the converter 7 via a rectifier arrangement. In the present embodiment, the rectifier arrangement includes a series circuit with a rectifier element 77, such as a diode (as illustrated) or a synchronous rectifier (not illustrated), and a capacitor 78, where the capacitor 78 is connected to the output terminals 73, 74. Of course, any other type of rectifier arrangement that can be employed in a flyback converter may be used instead of the rectifier arrangement with the diode 77 and the capacitor 78 as well.

The DC/DC converter further includes a drive circuit 79 that is configured to provide a pulse-width modulated drive signal S75 to a control terminal of the electronic switch 75. The control circuit 79 receives an output voltage signal $Sv_5$ that is dependent on the output voltage V5 of the second charge storage and is configured to adjust a duty cycle of the drive signal S75 such that the output voltage V5 is regulated to assume a given set value. The output voltage $Sv_5$ can be generated in a conventional manner by measuring the output voltage V5. The control circuit 79 can be implemented as a conventional pulse-width modulation (PWM) controller that is configured to generate a pulse-width modulated drive signal S75 dependent on a voltage measurement signal and a set value. Those PWM controllers are commonly known, so that no further explanations are required in this regard.

The power supply system of FIG. 6 can be configured such that the second charge storage 5 is only charged via the DC/DC controller 7 from the first charge storage 1. It should be noted, that loads connected to the load terminals 11, 12 of the first charge storage 1 and the load terminals 51, 52 of the second charge storage 5 are not illustrated in FIG. 6. In this power supply system energy has to be transferred from the first charge storage 1 to the second charge storage 5 when the second charge storage 5 powers loads connected to its load terminals 51, 52, so that the second charge storage 5 is discharged. In this system, the DC/DC converter 7 and the charge transfer arrangement 3 supply energy to the charge storage 5, where the energy or power provided by the charge transfer arrangement 3 may vary dependent on whether the charging states of the individual charge storage modules $2_1$, $2_2$, $2_n$ are unbalanced or are balanced. When the charge storage modules $2_1$, $2_2$, $2_n$ are strongly unbalanced, a part of the power the second charge storage 5 receives from the first charge storage 1 can be provided via the charge transfer arrangement 3, where the rest of the power of the second charge storage 5 required from the first charge storage 1 is provided through the DC/DC converter 7.

According to a further embodiment, the DC/DC converter 7 is omitted and there are no other generators in the system that charge the second charge storage 5. In this case, the second charge storage 5 is only charged via the charge transfer arrangement 3. In this case, the charge transfer arrangement 3 receives the output voltage signal $S_{V5}$. In this case, the charge transfer arrangement dependent on the output voltage signal $S_{V5}$ transfers charge from the first charge storage 1 to the second charge storage 5. When, for example, the individual charge storage modules $2_1$, $2_2$, $2_n$ are balanced, the charge transfer arrangement 3 may cyclically transfer energy from the individual charge storage modules $2_1$, $2_2$, $2_n$ to the second charge storage 5.

Figure 8:
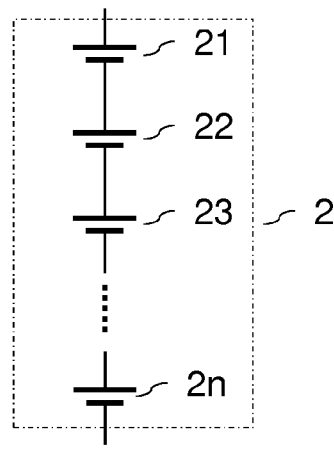
FIG. 8 illustrates an embodiment of one charge storage module of the first charge storage.

FIG. 8 illustrates an embodiment of one charge storage module 2. In this embodiment, the charge storage module 2 includes a plurality of charge storage cells 81, 82, 83, 8n connected in series. Each of the charge storage cells may include a plurality of sub-cells connected in parallel. The charge storage cells are, for example, lithium-ion cells.

Figure 9:
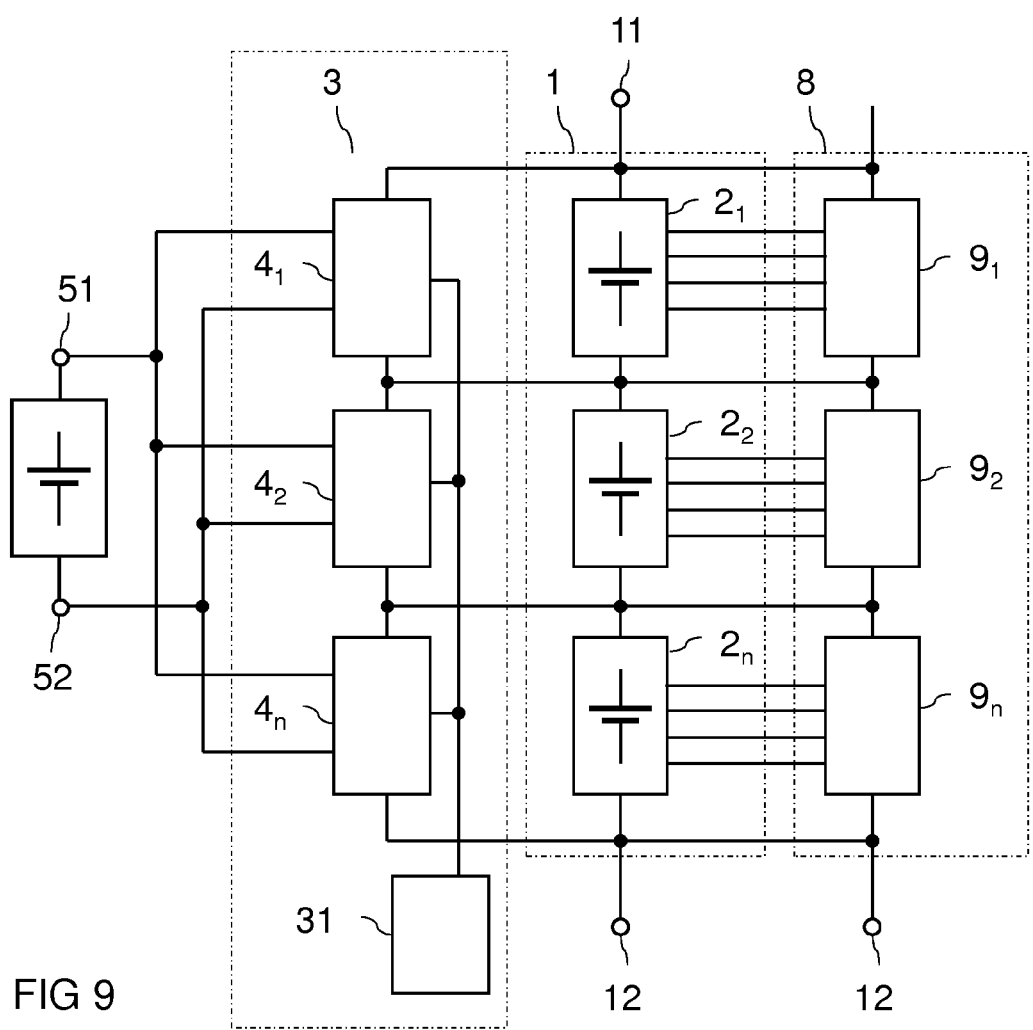
FIG. 9 illustrates an embodiment of a power supply system which includes charge balancing circuits of the individual charge storage modules of the first charge storage.

FIG. 9 illustrates a further embodiment of a power supply system. In this power supply system at least one of the charge storage modules $2_1$, $2_2$, $2_n$ has a charge balancing module $9_1$, $9_2$, $9_n$ of a further charge balancing circuit 8 connected thereto. In the embodiment illustrated in FIG. 9, each of the charge storage modules $2_1$, $2_2$, $2_n$ has a charge balancing module $9_1$, $9_2$, $9_n$ connected thereto. The individual charge balancing modules $9_1$, $9_2$, $9_n$ are configured to balance the charging states of the individual charge storage cells within the individual charge storage modules $2_1$, $2_2$, $2_n$.

Figure 10:
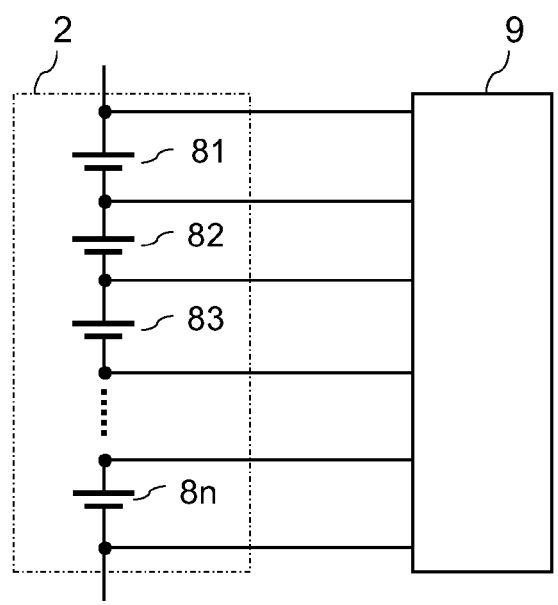
FIG. 10 illustrates the connection of one charge balancing circuit to one charge storage module in greater detail.

FIG. 10 schematically illustrates one charge storage module 2 with charge storage cells 81, 82, 83, 8n and a charge balancing module 9 connected to the charge storage module 2. The charge balancing module 9 is connected to each of the charge storage cells 81, 82, 83, 8n, is configured to detect the charging state of the individual charge storage cells 81, 82, 83, 8n and is configured to balance the charging state of these charge storage cells 81, 82, 83, 8n. The charge balancing module 9 can be a conventional charge balancing module that is configured to balance the charging states of charge storage cells connected in series. The charge balancing module 9 can be configured to operate in accordance with at least one of several known charge balancing principles. According to one charge balancing principle the charge balancing module 9 takes energy from one of the charge storage cells, such as the charge storage cell that has the highest charging state, and feeds the energy back into the series circuit with the individual charge storage cells 81, 82, 83, 8n. According to another charge balancing principle the charge balancing module 9 takes energy from the series circuit with the charge storage cells 81, 82, 83, 8n and feeds the energy back into one of the charge storage cells, such as the charge storage cell having the lowest charging state. According to a third charge balancing principle, the charge balancing module 9 takes energy from one of the charge storage cells 81, 82, 83, 8n, such as the charge storage cell having the highest charging state, and feeds the energy back into another charge storage 81, 82, 83, 8n such as the charge storage cell having the lowest charging state. Charge balancing modules with such a functionality are commonly known so that no further explanations are required in this regard.

The power supply system explained herein before is very flexible. Any number of charge storage modules $2_1$, $2_2$, $2_n$ can be connected in series. The high supply voltage V1 is only present at the load terminals 11, 12 and at the load connected to the first charge storage 1 and at the optional DC/DC converter 7. The maximum voltage that is present at the charge transfer modules $4_1$, $4_2$, $4_n$ is the supply voltage of one module $2_1$, $2_2$, $2_n$. Thus, in the charge transfer arrangement no high voltage isolations are required. This is, in particular, helpful when the charge storage modules are distributed in the car.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

Spatially relative terms such as "under", "below", "lower", "over", "upper" and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc., and are also not intended to be limiting Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A power supply system, comprising:
a first charge storage comprising a series circuit with a plurality of n charge storage modules, connected between load terminals, wherein n>1;
a second charge storage comprising load terminals; and
a unidirectional charge transfer arrangement comprising a plurality of charge transfer units coupled between corresponding ones of the plurality of n charge storage modules and the load terminals of the second charge storage, wherein each charge transfer unit is configured to transfer upon request electrical charge from the corresponding ones of the plurality of n charge storage modules to only the second charge storage, and wherein the unidirectional charge transfer arrangement is configured to balance charging states of the plurality of n charge storage modules.

2. The power supply system of claim 1, wherein the plurality of charge transfer units comprises n charge transfer units, wherein each charge transfer unit is coupled between the corresponding ones of the plurality of n charge storage modules and the load terminals of the second charge storage.

3. The power supply system of claim 1, wherein the first charge storage includes between 2 and 20 charge storage modules.

4. The power supply system of claim 3, wherein the first charge storage includes between 8 and 12 charge storage modules.

5. The power supply system of claim 1,
wherein the first charge storage is configured, in a charged state, to provide a first supply voltage between its load terminals,
wherein the second charge storage is configured, in a charged state, to provide a second supply voltage between its load terminals, and
wherein the first supply voltage is higher than the second supply voltage.

6. The power supply system of claim 5, wherein the first supply voltage is between 350V and 450V and wherein the second supply voltage is between 10V and 14V.

7. The power supply system of claim 1, wherein each charge transfer arrangement further comprises:
a control circuit that is in signal communication with the at least one charge transfer unit and that is configured to request the at least one charge transfer unit to transfer electrical charge to the second charge storage.

8. The power supply system of claim 7, wherein each charge transfer unit
is configured to measure a module supply voltage of the charge storage module it is connected to and
is configured to provide an information on an amplitude of the module supply voltage to the control circuit.

9. The power supply system of claim 8, wherein:
the plurality of charge transfer units comprises m charge transfer units, wherein m>1, each charge transfer unit is configured to measure a module supply voltage of the charge storage module it is connected to and to provide information on the amplitude of the module supply voltage to the control circuit,
wherein the control circuit is configured to evaluate the information on the amplitudes received for the charge transfer units and to request one of the charge transfer units to transfer electrical charge to the second charge storage based on this evaluation.

10. The power supply system of claim 9, wherein the control circuit is configured to determine the charge storage module with a highest module supply voltage and is configured to request a charge transfer module coupled to this charge storage module to transfer electrical charge to the second charge storage.

11. The power supply system of claim 1, wherein each transfer unit comprises:
a transformer with a primary winding and a secondary winding;
an electronic switch connected in series with the primary winding, a series circuit with the primary winding and the electronic switch coupled to the corresponding ones of the plurality of n charge storage modules;
a rectifier element connected in series with the secondary winding, a series circuit with the secondary winding and the rectifier element coupled to the second charge storage; and
a drive circuit configured to drive the electronic switch upon request.

12. The power supply system of claim 11, wherein each charge transfer unit further comprises:
a voltage measurement unit configured to measure a module supply voltage of the charge storage module the at least one charge transfer unit is coupled to; and
an interface circuit coupled to the drive circuit and the voltage measurement unit, the interface circuit in signal communication with a control circuit of the charge transfer arrangement.

13. The power supply system of claim 1,
wherein the charge storage modules of the second charge storage each include a plurality of charge storage sub-modules connected in series, and
wherein the power supply system further comprises at least one module charge balancing unit coupled to one charge storage module and configured to transfer electrical charge from one charge storage sub-module to another charge storage sub-module, from one charge storage sub-module to the charge storage module, and/or from the charge storage module to one charge storage sub-module.

14. The power supply system of claim 1, further comprising:
a DC/DC converter having input terminals coupled to the load terminals of the first charge storage, and having output terminals coupled to the load terminals of the second charge storage.

15. The power supply system of claim 14, wherein the DC/DC converter is a boost converter.

16. An automotive electric system, comprising:
a power supply system, comprising:
a first charge storage comprising a series circuit with a plurality of n charge storage modules, connected between load terminals, wherein n>1;
a second charge storage comprising load terminals; and
a unidirectional charge transfer arrangement comprising a plurality of charge transfer units coupled between corresponding ones of the plurality of n charge storage modules and the load terminals of the second charge storage, the charge transfer unit configured to discharge upon request electrical charge from the corresponding ones of the plurality of n charge storage modules to only the second charge storage, wherein the unidirectional charge transfer arrangement is configured to balance charging states of the plurality of n charge storage modules;
at least one first load connected to the load terminals of the first charge storage; and
at least one second load connected to the load terminals of the second charge storage.

17. The automotive electric system of claim 16, wherein the at least one first load is a motor.

18. The automotive electric system of claim 16, wherein the at least one second load comprises at least one of the following: an electric window lifter, a radio, a CD player, a DVD player, a navigation system, an electric actor, an air conditioning system, a lighting system, a vehicle control system, a sensor, a safety system.

19. The automotive electric system of claim 16, further comprising a generator coupled to the load terminals of the second charge storage.

20. A method of operating a power supply comprising:
powering an automotive motor with a first charge storage, wherein the first charge storage comprises a plurality of series connected energy storage modules;
powering a plurality of peripheral automotive loads with a battery; and
balancing charging states of the plurality of series connected energy storage modules, balancing comprising transferring charge from an energy storage module of the plurality of series connected energy storage modules in the first charge storage to the battery using a plurality of charge transfer arrangements, wherein each charge transfer arrangement is configured only to discharge energy storage modules in the first charge storage unidirectionally to the battery.

21. The method of claim 20, wherein powering the automotive motor comprises supplying a voltage greater than 50 volts from the first charge storage.

22. The method of claim 20, wherein powering the plurality of peripheral automotive loads comprises supplying a voltage less than 50 volts from the battery.

23. The power supply system of claim 1, each charge transfer unit is only capable of discharging the corresponding ones of the plurality of n charge storage modules, wherein energy taken from discharging the corresponding ones of the plurality of n charge storage modules is not fed back into another charge storage module of the plurality of n charge storage modules or into the load terminals of the first charge storage.

24. The power supply system of claim 1, wherein each charge transfer unit comprises a galvanically isolated DC-DC converter.

25. The power supply system of claim 1, wherein the first charge storage provides an output voltage of between 350 V and 450 V.

26. The automotive electric system of claim 16, wherein each charge transfer unit comprises a galvanically isolated DC-DC converter.

27. The automotive electric system of claim 16, wherein the first charge storage provides an output voltage of between 350 V and 450 V.

28. The method of claim 20, wherein each charge transfer unit comprises a galvanically isolated DC-DC converter.

29. The method of claim 20, wherein the first charge storage provides an output voltage of between 350 V and 450 V.

30. The power supply system of claim 1, wherein the unidirectional charge transfer arrangement is configured to balance charging states of the plurality of n charge storage modules by selectively transferring charge from ones of the plurality of n charge storage modules to the second charge storage.

31. The automotive electric system of claim 16, wherein the unidirectional charge transfer arrangement is configured to balance charging states of the plurality of n charge storage modules by selectively transferring charge from ones of the plurality of n charge storage modules to the second charge storage.

32. The method of claim 20, wherein balancing comprises selectively transferring the charge from the plurality of series connected energy storage modules unidirectionally to the battery.

* * * * *